United States Patent
Miyamoto et al.

(10) Patent No.: US 6,818,047 B2
(45) Date of Patent: Nov. 16, 2004

(54) INK FOR BALL PEN AND BALL PEN

(75) Inventors: Masaru Miyamoto, Yokohama (JP);
Shigeru Miyazaki, Yokohama (JP);
Youji Takeuchi, Yokohama (JP)

(73) Assignee: Mitsubishi Pencil Kabushikikaisha, Tokyo (JP)

( * ) Notice: Subject to any disclaimer, the term of this patent is extended or adjusted under 35 U.S.C. 154(b) by 51 days.

(21) Appl. No.: 10/149,655

(22) PCT Filed: Dec. 18, 2000

(86) PCT No.: PCT/JP00/08957

§ 371 (c)(1),
(2), (4) Date: Jun. 14, 2002

(87) PCT Pub. No.: WO01/48103

PCT Pub. Date: Jul. 5, 2001

(65) Prior Publication Data

US 2003/0005854 A1 Jan. 9, 2003

(30) Foreign Application Priority Data

Dec. 24, 1999 (JP) ............................................. 11/365802

(51) Int. Cl.⁷ .............................................. C09D 11/18
(52) U.S. Cl. ................................ 106/31.13; 106/31.36; 106/31.39; 106/31.58; 106/31.68; 106/31.71; 106/31.86
(58) Field of Search ........................... 106/31.13, 31.36, 106/31.39, 31.58, 31.68, 31.71, 31.86

(56) References Cited

U.S. PATENT DOCUMENTS

| | | | | |
|---|---|---|---|---|
| 5,034,058 A | * | 7/1991 | Akiyama et al. | 106/31.51 |
| 5,069,719 A | * | 12/1991 | Ono | 524/130 |
| 5,514,208 A | * | 5/1996 | Nagai et al. | 106/31.43 |
| 5,965,634 A | * | 10/1999 | Idogawa et al. | 523/161 |
| 6,146,452 A | * | 11/2000 | Takeuchi | 106/31.58 |
| 6,264,729 B1 | * | 7/2001 | Miyamoto et al. | 106/31.36 |

FOREIGN PATENT DOCUMENTS

| | | |
|---|---|---|
| CN | 1174217 A | 2/1998 |
| EP | 0 818 518 A2 | 7/1997 |
| EP | 1 036 833 A1 | 11/1998 |
| JP | 7-216284 A | 8/1995 |
| JP | 8-239617 A | 9/1996 |
| JP | 9-249844 A | 9/1997 |
| JP | 9-316323 A | 12/1997 |
| JP | 10-25444 A | 1/1998 |
| JP | 10-77438 A | 3/1998 |
| JP | 11-349885 A | 12/1999 |

* cited by examiner

*Primary Examiner*—Helene Klemanski
(74) *Attorney, Agent, or Firm*—Kubovcik & Kubovcik

(57) ABSTRACT

In a ball pen which is formed to have an ink-consumption value per unit area of 0.64 to 1.6 mg/cm², the water content is adjusted in the range from 30.0 to 80.0 wt %, the content of a volatilization-inhibiting substance in the range from 0.1 to 10.0 wt % and the content of a hardly-volatile water-soluble liquid medium in the range from 1.0 to 40.0 wt % in the ink for a ball pen in order to achieve both the quick-drying property of the ink transferred onto the paper surface and the non-drying property of the point of the pen-tip and further a good writing feeling.

5 Claims, No Drawings

INK FOR BALL PEN AND BALL PEN

TECHNICAL FIELD

The present invention relates to ink for a ball pen which is called medium viscosity ink, neutral ink, gel ink, aqueous gel ink or the like, and to a ball pen using the ink for a ball pen, more specifically the present invention relates to ink for a ball pen which consumes much ink, that is, a ball pen for writing thick and bold letters and a bold ball pen using the ink for a ball pen.

BACKGROUND ART

Various types of ball pen have been proposed conventionally.

For example, there is provided a ball pen filled with ink using water or an aqueous medium as a solvent and dye or pigment as a colorant. Hereinafter the ink is referred to as "aqueous ink" and the ball pen as an "aqueous ball pen."

The aqueous ball pen shows so low viscosity that it may advantageously write smoothly at low writing-pressure. On the other hand, however, it is likely to occur that, when the pen is exposed to vibration or impact, the ink leaks from the point of pen-tip (hereinafter referred to as "direct flow") and that the stability of the ink-flow rate decreases (hereinafter referred to as "fluctuating") by the air involved from the point of the pen-tip. Further, the aqueous ball pen also has a defect that lines written therewith tend to be blurred.

Meanwhile, there is also provided a ball pen filled with ink using an organic medium as a solvent and dye or pigment as a colorant. Hereinafter the ink is referred to as "oil-based ink" and the ball pen as an "oil-based ball pen."

Since the oil-based ball pen uses highly viscous ink, it is free from above-mentioned defects as seen in the aqueous ball pen. However, it has a defect that high writing pressure is needed for writing, resulting in a heavy writing feeling. Further, it also has a defect that it is likely to make the pen-tip and the paper surface dirty with ink blots (hereinafter referred to as "blotting").

There has recently been provided a ball pen filled with ink using water or a water-soluble medium as a solvent, dye or pigment as a colorant and, further, a pseudoplasticizing so that the ink may have pseudoplasticity. Hereinafter the of ink is referred to as "aqueous gel ink" and the ball pen as an "aqueous-gel ball pen."

Here, pseudoplasticity is a property showing non-flowability in a static state and also showing flowability when a shearing force is applied.

The aqueous gel ink shows non-flowability in an ink reservoir as well as the oil-based ink while it shows flowability like aqueous ink near the point of the pen-tip where a shearing force is applied to the ink due to the rotation of the ball.

Accordingly, the aqueous-gel ball pen has both the advantage of an aqueous ball pen and that of an oil-based ball pen. That is, the aqueous-gel ball pen has advantages that it can write smoothly at a low writing pressure, that the lines written therewith are hard to blur and that the blotting is less likely to occur.

Actually, however, the production of the aqueous-gel ball pen is not so easy.

For example, a pen-tip containing a ball with a diameter of 0.5 mm and a pen-tip containing a ball with a diameter of 0.7 mm are different in the clearance between the ball and a holder as well as in the shearing force applied to the ink caused by rotation of the ball. Therefore, if aqueous gel ink suitable for one of these two types of pen-tips is used for the other, the direct flow and fluctuating will occur or the blotting will occur.

Accordingly, the viscosity of the aqueous gel ink should be adjusted in accordance with the pen-tip to be used.

Further, an aqueous-gel ball pen with which relatively thick and bold letters (hereinafter referred to as an "aqueous-gel bold ball pen") can be written is desired recently.

The aqueous-gel bold ball pen uses a ball with a diameter of 0.9 mm or more so as to be adapted for writing bold letters.

Further, the aqueous-gel bold ball pen is formed to have a relatively large clearance between the ball and the holder since, only by enlarging the diameter of the ball, the written line, which can be wider, appears pale in color.

Moreover, the aqueous-gel bold ball pen needs so much ink to be supplied to the pen-tip as to account for the amount according to the larger diameter of the ball and the amount according to the larger clearance between the ball and the holder.

Specifically, ink should be supplied to the pen-tip so that the ink-consumption value per unit area may fall within a range on the order of 0.64 to 1.6 mg/cm$^2$.

This ink-consumption corresponds to as much as 1.5 to 3 times that of a conventional aqueous-gel ball pen.

When the ink-consumption is increased, however, the ink transferred onto the paper surface becomes hard to dry.

From this reason, water content in the ink is made relatively high in such an aqueous-gel bold ball pen for the purpose of enhancing quick-drying property of the ink transferred onto the paper surface.

Relatively high water content in the ink improves the quick-drying property of the ink transferred onto the paper surface while it leads to a disadvantage that the point of the pen-tip is easy to dry.

Further, when the water content in the ink is made relatively high, friction resistance between the ball and the holder increases, which leads to a disadvantage that the writing feeling is deteriorated.

That is, such an attempt to improve the quick-drying property of the ink transferred onto the paper surface results in the fact that the point of the pen-tip is easy to dry and that the writing feeling is deteriorated.

It is very difficult to strike a balance between the quick-drying property of the ink transferred onto the paper surface and the non-drying property of the point of the pen-tip while maintaining good writing feeling.

DISCLOSURE OF THE INVENTION

Accordingly, the object of the present invention is to provide ink for a ball pen to be used in an aqueous-gel bold ball pen as described above which is excellent in quick-drying property when transferred onto the paper surface and makes the point of the pen-tipless likely to dry and further improves writing feeling.

Further, the object of the present invention is to provide an aqueous-gel bold ball pen as described above wherein the ink transferred onto the paper surface tends to be dried, keeps the point of the pen-tip less likely to dry and further provides a good writing feeling.

The present inventors have made intensive studies to achieve the above-described objects and found that, by relatively high water content and addition of a specific amount of a volatilization-inhibiting substance and a hardly-volatile water-soluble liquid medium, ink for a ball pen to be filled in an aqueous-gel bold ball pen as described above can be provided with both quick-drying property when transferred onto the paper surface and non-drying property of the point of the pen-tip and that it also maintains a good writing feeling, and thus completed the following inventions.

Namely, the present invention is characterized in that ink for a ball pen to be used in a ball pen formed to have an ink-consumption value per unit area of 0.64 to 1.6 mg/cm$^2$ comprises 30.0 to 80.0 wt % of water, 0.1 to 10.0 wt % of a volatilization-inhibiting substance and 1.0 to 40.0 wt % of a hardly-volatile water-soluble liquid medium.

Here, the term "ink-consumption value per unit area" means a value obtained by dividing an "ink-consumption value per unit length" by the "line width."

The term "ink-consumption value per unit length" means an ink-consumption value per unit length according to ISO standards.

The ink-consumption value per unit length can be measured by using a writing test machine in compliance with ISO standard 14145-1 under specified conditions (e.g., at a writing speed of 4.5 m/min, a writing angle of 600 and a writing load of The ink-consumption value per unit length of an aqueous-gel bold ball pen is preferably on the order of 300 to 750 mg/100 m. This is because when the ink-consumption value per unit length is 300 mg/100 m or less, written lines look pale in color. On the other hand, when the ink-consumption value per unit length is 750 mg/100 m or more, the ink transferred onto the paper surface is hard to dry.

The term "line width" means a width of a line written on the paper.

The line width may vary depending on the quality of paper but it is on the order of 0.47 mm when the line is written on the writing test paper in compliance with ISO standard 14145-1 by a ball with a diameter of 1.0 mm.

Accordingly, the ink-consumption value per unit area of an aqueous-gel bold ball pen containing a ball with a diameter of 1.0 mm is, for instance, on the order of 0.64 to 1.6 mg/cm$^2$.

The ball diameter is not limited to 1.0 mm and may be, for example, 0.9 mm or 1.1 mm provided that the ink-consumption value per unit area is adjusted to a value in the range of 0.64 to 1.6 mg/cm$^2$.

Distilled water and ion-exchanged water, for example, can be used as the "water".

The water content is preferably on the order of 30.0 to 80.0 wt % to the total amount of the ink for a ball pen. If the water content is 30.0 wt % or less, the ink is very hard to dry when transferred onto the paper surface and the ink-flow rate from the point of the pen-tip decreases. On the other hand, if the water content is 80.0 wt % or more, the point of the pen-tip becomes very easy to dry and the ink becomes unstable during the time course.

When the water content is in a range of 30.0 to 80.0 wt %, that is, at a relatively high water content, quick-drying property of the ink transferred onto the paper surface can be improved.

The term "volatilization-inhibiting substance" is a substance to reduce the volatilization of the water in ink for a ball pen.

Specifically, for example, compounds such as reducing sugars comprising maltitol as a major component, reducing sugars comprising sorbitol as a major component, reducing oligosaccharides, reducing maltooligosaccharides, reducing dextrins, reducing maltodextrins, α-cyclodextrin, β-cyclodextrin, maltosylcyclodextrins, reducing saccharified starches and reducing maltose can be used as a volatilization-inhibiting substance.

Each of these compounds may be used alone or two or more of them may be used in combination.

The content of the volatilization-inhibiting substance is preferably on the order of 0.1 to 10.0 wt % to the total amount of the ink for a ball pen. If the content of the volatilization-inhibiting substance is 0.1 wt % or less, the point of the pen-tip cannot be sufficiently prevented from drying. On the other hand, if the content of the volatilization-inhibiting substance is 10.0 wt % or more, the ink becomes hard to dry when transferred onto the paper surface and likely to blur.

Such a volatilization-inhibiting substance, when added to the ink for a ball pen, can prevent the drying of the point of the pen-tip even in the case where the water content is increased to a relatively high level. That is, both the quick-drying property of the ink transferred onto the paper surface and the non-drying property of the point of the pen-tip are achieved at the same time.

The term "hardly-volatile water-soluble liquid medium" means a liquid medium which is hard to volatilize and is readily soluble in water.

Specifically, for example, compounds such as polyvalent alcohols such as glycerine, propylene glycol and polyethylene glycol, ethers such as ethylene glycol monomethyl ether, alkylene oxide adducts of glycerine, alkylene oxide adducts of polyglycerine, alkylene oxide adducts of trimethylolpropane and the like can be used as a hardly-volatile water-soluble liquid medium.

Each of these compounds may be used alone or two or more of them may be used in combination.

The content of the hardly-volatile water-soluble liquid medium is preferably on the order of 1.0 to 40.0 wt % to the total amount of the ink for a ball pen. If the content of the hardly-volatile water-soluble liquid medium is 1.0 wt % or less, good writing feeling cannot be maintained sufficiently and the ink becomes unstable during the time course. On the other hand, if the content of the hardly-volatile water-soluble liquid medium is 40.0 wt % or more, the ink transferred onto the paper surface becomes hard to dry and the ink-flow rate from the point of the pen-tip decreases.

Such a hardly-volatile water-soluble liquid medium, when added to the ink for a ball pen along with a volatilization-inhibiting substance as described above, can prevent the deterioration of the writing feeling even in the case where the water content is increased to a relatively high level. That is, good writing feeling can be maintained while both the quick-drying property of the ink transferred onto the paper surface and the non-drying property of the point of the pen-tip are achieved at the same time.

The ink for a ball pen of the present invention may contain, for example, colorant, lubricant, preservative, rust preventive, pH-adjusting agent, thickener and the like in addition to the above-described ingredients.

The ink for a ball pen in the present invention is characterized in that the volatilization-inhibiting substance consists of one or more compounds selected from the group consisting of reducing sugars comprising maltitol as a major component, reducing sugars comprising sorbitol as a major component, reducing oligosaccharides, reducing maltooligosaccharides, reducing dextrins, reducing maltodextrins, α-cyclodextrin, β-cyclodextrin, maltosylcyclodextrins, reducing saccharified starches and reducing maltose, in addition to the constitution of the above-described ink for a ball pen.

The volatilization-inhibiting substance may consist of any one of these compounds used alone or the volatilization-inhibiting substance may consist of two or more of these compounds in combination.

The point of the pen-tip can be securely prevented from drying by composing the volatilization-inhibiting substance with one of these compounds alone or two or more of these compounds in combination.

The ink for a ball pen in the present invention is characterized in that the hardly-volatile water-soluble liquid medium consists of one or more compounds selected from the group consisting of polyvalent alcohols such as glycerine, propylene glycol and polyethylene glycol, ethers such as ethylene glycol monomethyl ether, alkylene oxide adducts of glycerine, alkylene oxide adducts of polyglycerine, alkylene oxide adducts of trimethylolpropane, in addition to the constitution of the above-described ink for a ball pen.

That is, the hardly-volatile water-soluble liquid medium may consist of any one of these compounds used alone or the hardly-volatile water-soluble liquid medium may consist of two or more of these compounds in combination.

Deterioration of the writing feeling can be securely prevented by composing the hardly-volatile water-soluble liquid medium with one of these compounds alone or two or more of these compounds in combination.

The present invention is characterized in that a ball pen formed to have an ink-consumption value per unit area of 0.64 to 1.6 mg/cm$^2$, which is filled with ink for ball pen comprising 30.0 to 80.0 wt % of water, 0.1 to 10.0 wt % of a volatilization-inhibiting substance and 1.0 to 40.0 wt % of a hardly-volatile water-soluble liquid medium.

Here, the meaning of the terms "ink-consumption value per unit area," "volatilization-inhibiting substance" and "hardly-volatile water-soluble liquid medium" are the same as described above.

A ball pen can be provided with both the quick-drying property of the ink transferred onto the paper surface and the non-drying property of the point of the pen-tip and further with a good writing feeling by filling such ink for a ball pen comprising water in a relatively high content and containing specific amounts of a volatilization-inhibiting substance and a hardly-volatile water-soluble liquid medium.

BEST MODE FOR CARRYING OUT THE INVENTION

Embodiments of the ink for a ball pen and the ball pen using the ink for a ball pen according to the present invention will be hereinafter described.

(Ink for a Ball Pen)

The ink for a ball pen according to an embodiment of the present invention is to be used in a ball pen which is formed to have an ink-consumption value per unit area of 0.64 to 1.6 mg/cm$^2$ and comprises 30.0 to 80.0 wt % of water, 0.1 to 10.0 wt % of a volatilization-inhibiting substance and 1.0 to 40.0 wt % of a hardly-volatile water-soluble liquid medium.

The ink for a ball pen according to the embodiment also contains colorant, lubricant, preservative, rust preventive, pH-adjusting agent, thickeners, etc. in addition to the above-described ingredients.

(Colorant)

Any kind of dye or pigment which has been used for ink for a ball pen and which can be dissolved or dispersed in water can be used as colorant.

Specifically, for example, following acid dyes can be used as colorant: C.I. Acid Black 1, 2, 24, 26, 31, 52, 107, 109, 110, 119 and 154; C.I. Acid Yellow 7, 17, 19, 23, 25, 29, 38, 42, 49, 61, 72, 78, 110, 141, 127, 135 and 142; C.I. Acid Red 8, 9, 14, 18, 26, 27, 35, 37, 51, 52, 57, 82, 87, 92, 94, 111, 129, 131, 138, 186, 249, 254, 265, and 276; C.I. Acid Violet 15 and 17; C.I. Acid Blue 1, 7, 9, 15, 22, 23, 25, 40, 41, 43, 62, 78, 83, 90, 93, 103, 112, 113 and 158; and C.I. Acid Green 3, 9, 16, 25 and 27.

For example, following basic dyes can also be used as colorant: C.I. Basic Yellow 1, 2 and 21; C.I. Basic Orange 2, 14 and 32; C.I. Basic Red 1, 2, 9 and 14; C.I. Basic Violet 1, 3 and 7; C.I. Basic Brown 12; and C.I. Basic Black 2 and 8.

In addition, for example, following direct dyes can also be used as colorant: C.I. Direct Black 17, 19, 22, 32, 38, 51 and 71; C.I. Direct Yellow 4, 26, 44 and 50; C.I. Direct Red 1, 4, 23, 31, 37, 39, 75, 80, 81, 83, 225, 226 and 227; and C.I. Direct Blue 1, 15, 71, 86, 106 and 119.

In addition, for example, following inorganic pigments can also be used as colorant: titanium oxide, carbon black, red iron oxide, chromium oxide, black iron oxide, cobalt blue, alumina white, yellow iron oxide, viridian, zinc sulfide, lithopone, cadmium yellow, vermilion, cadmium red, chrome yellow, molybdate orange, zinc chromate, strontium chromate, white carbon, clay, talc, ultramarine, precipitated barium sulfate, baryte powder, calcium carbonate, white lead, Prussian blue, manganese violet, aluminum powder, stainless steel powder, nickel powder, copper powder, zinc powder and bronze powder.

In addition, for example, following organic pigments can also be used as colorant: azo lake, insoluble azo pigments, chelate azo pigments, phthalocyanine pigments, perylene and perinone pigments, anthraquinone pigments, quinacridone pigments, dye lakes, nitropigments and nitroso pigments, more specifically, organic pigments such as phthalocyanine blue (C.I. 74160), phthalocyanine green (C.I. 74260), Hansa yellow 3G (C.I. 11670), disazo yellow GR (C.I. 21100), Permanent red 4R (C.I. 12335), Brilliant carmine 6B (C.I. 15850) and quinacridone red (C.I. 46500).

Each of these dyes and pigments may be used alone or two or more of them may be used in combination.

The content of the colorant is preferably on the order of 0.1 to 40 wt % to the total amount of the ink for a ball pen. If the content of the colorant is 0.1 wt % or less, written lines look pale in color. On the other hand, if the content of the colorant 40 wt % or more, the ink becomes unstable during the time course.

(Hardly-volatile Water-soluble Liquid Medium)

Examples of usable hardly-volatile water-soluble liquid mediums include compounds such as polyvalent alcohols such as glycerine, propylene glycol and polyethylene glycol, ethers such as ethylene glycol monomethyl ether, alkylene oxide adducts of glycerine, alkylene oxide adducts of polyglycerine, alkylene oxide adducts of trimethylolpropane and the like.

Each of these compounds may be used alone or two or more of them may be used in combination.

The content of the hardly-volatile water-soluble liquid medium is preferably on the order of 1.0 to 40.0 wt % to the total amount of the ink for a ball pen. If the content of the hardly-volatile water-soluble liquid medium is 1.0 wt % or less, good writing feeling cannot be maintained sufficiently and the ink becomes unstable during the time course. On the other hand, if the content of the hardly-volatile water-soluble liquid medium is 40.0 wt % or more, the ink transferred onto the paper surface becomes hard to dry and the ink-flow rate from the point of the pen-tip decreases.

(Volatilization-inhibiting Substance)

Compounds such as reducing sugars comprising maltitol as a major component, reducing sugars comprising sorbitol as a major component, reducing oligosaccharides, reducing maltooligosaccharides, reducing dextrins, reducing maltodextrins, α-cyclodextrin, β-cyclodextrin, maltosylcyclodextrins, reducing saccharified starches and reducing maltose can be used as volatilization-inhibiting substance.

Specifically, for example, TK-16 and TK-75 (trade name, Matsutani Chemical Industry Co., Ltd.), Diatol N and Diatol K (trade name, San-ei Sucrochemical, Co., Ltd.), SE 20 and SE 58 (trade name, Nikken Chemicals Co., Ltd.), PO-300 and PO-20 (trade name, Towa Chemical Industry Co., Ltd.), etc. can be used as volatilization-inhibiting substance.

Each of these compounds may be used alone or two or more of them may be used in combination.

The content of the volatilization-inhibiting substance is preferably on the order of 0.1 to 10.0 wt % to the total amount of the ink for a ball pen. If the content of the volatilization-inhibiting substance is 0.1 wt % or less, drying of the point of the pen-tip cannot be sufficiently prevented. On the other hand, if the content of the volatilization-inhibiting substance is 10.0 wt % or more, the ink transferred onto the paper surface becomes hard to dry and likely to blur.

(Lubricant)

Examples of usable lubricants include compounds such as potash soap, phosphoric acid esters, potassium linoleate, potassium oleate, sodium oleate, glycerine fatty acid esters, polyglycerine fatty acid esters, propylene glycol fatty acid esters, pentaerythritol fatty acid esters, polyoxyethylene sorbitan fatty acid esters, pentaerythritol fatty acid esters, polyoxyethylene sorbitan fatty acid esters, polyoxyethylene sorbit fatty acid esters, polyoxyethylene glycerine fatty acid esters, polyethylene glycol fatty acid esters, polyoxyethylene alkyl ethers, polyoxyethylene fitosterol, polyoxyethylene polyoxypropylene alkyl ethers, polyoxyethylene alkylphenyl ethers, polyoxyethylene castor oil, polyoxyethylene lanolin, polyoxyethylene lanolin alcohol, polyoxyethylene alkylamines, polyoxyethylene fatty acid amides and polyoxyethylene alkylphenylformaldehyde condensation products.

Each of these compounds may be used alone or two or more of them may be used in combination.

(Preservative)

For example, sodiumomadine, 1,2-benzoisothiazoline, etc. can be used as preservative.

Each of them may be used alone or two or more of them may be used in combination.

(Rust Preventive)

Examples of usable rust preventives include saponins, tolyltriazole, benzotriazole, octyl phosophate, dioctyl thiophosphate, imidazole, benzimidazole, 2-mercaptobenzothiazole, octyl oxymethanephosphonate, dicyclohexylammonium nitrite, diisopropylammonium nitrite, propargyl alcohol, dialkyl thiourea, etc.

Each of these compounds may be used alone or two or more of them may be used in combination.

(pH-adjusting Agent)

Examples of usable pH-adjusting agents include sodium hydroxide, potassiumhydroxide, potassiumphosphate, calcium hydroxide, sodium carbonate, sodium hydrogen carbonate, ammonia, methylamine, dimethylamine, trimethylamine, ethylamine, diethylamine, triethylamine, propylamine, dipropylamine, tripropylamine, butylamine, dibutylamine, tributylamine, isobutylamine, diisobutylamine, 2-butaneamine, N-(1-methylpropyl)-1-propaneamine N,N-dimethylbutylamine, 1,2-dimethylpropylamine, N-ethyl-1,2-dimethylpropylamine, allylamine, diallylamine, triallylamine, N,N-dimethylallylamine, N-methyldiallylamine, 3-pentylamine, N,N-diisopropylethylamine, 2-(hydroxymethylamino) ethanol, 2-aminopropanol, 3-aminopropanol, triethanolamine, monoethanolamine, diethanolamine, 2-amino-2-methyl-1-propanol, N-isobutyldiethanolamine, 3-methoxypropylamine, 3-propyloxypropylamine, 3-isopropyloxypropylamine, 3-butoxypropylamine, etc.

Each of these compounds may be used alone or two or more of them may be used in combination.

(Thickener)

Examples of usable thickeners include gum arabic, tragacanth gum, locust bean gum, guar gum, alginic acid, alginic acid salts, pectin, carrageenan, gelatin, casein, sodium casein, xanthane gum, rhamsan gum, welan gum, gellan gum, dextran, methyl cellulose, ethyl cellulose, hydroxyethyl cellulose, carboxymethyl cellulose, hydroxypropyl cellulose, sodium starch glycolate, lanolin derivatives, chitosan derivatives, lactalbumin, polyethylene oxide, polyethylene glycol, polyvinyl alcohol, polyvinyl methyl ether, polyvinylpyrrolidone and derivatives thereof, polyacrylic acidresins, bridgingpolyacrylic resin, polyurethane resins, carboxyvinyl polymer, etc.

Specifically, for example, Junron PW-111 (trade name, Nippon Jun-yaku Co., Ltd.), Hiviswako 103 (trade name, Wako Pure chemical Industries, Co., Ltd.), KELZAN, KELZANAR, K1A96, K1A112, RHEOZAN and K7C233 (trade name, Sansho Co., Ltd.), JAGUAR HP-8, JAGUAR HP-60, RHODOPOL23 and RHODOPOL 50MC (trade name, Rhone Poulenc Japan, Ltd.), Echo Gum GH (trade name, Dainippon Pharmaceutical Co., Ltd.), etc. can be used as a thickener.

Each of these compounds may be used alone or two or more of them may be used in combination.

(Water)

Water composes a major part of the ingredients of the ink for a ball pen other than the above-mentioned ingredients from colorant to thickener. Distilled water or ion-exchanged water is used in the embodiment.

The water content is preferably on the order of 30.0 to 80.0 wt % to the total amount of the ink for a ball pen. If the water content is 30.0 wt % or less, the ink is extremely hard to dry when transferred onto the paper surface and the ink-flow rate from the point of the pen-tip decreases. On the other hand, if the water content is 80.0 wt % or more, the point of the pen-tip becomes very easy to dry and the ink becomes unstable during the time course.

(Other Ingredients)

In addition to the above-mentioned ingredients, resins such as ammonium salts of styrene maleic acid or ammonium salts of styrene acrylic acid maybe added as dispersant of pigment.

(Production Method for Ink for a Ball Pen)

Method for producing ink for a ball pen of the embodiment does not differ especially from those for producing conventional ink for a ball pen.

That is, ink for a ball pen of the embodiment can be produced by mixing and stirring the above-described ingredients.

(Ball Pen)

Hereinafter, the ball pen according to the present invention will be described.

The ball pen according to the embodiment is formed to have an ink-consumption value per unit area of 0.64 to 1.6 mg/cm$^2$ and filled with ink for a ball pen comprising 30.0 to 80.0 wt % of water, 0.1 to 10.0 wt % of a volatilization-inhibiting substance and 1.0 to 40.0 wt % of a hardly-volatile water-soluble liquid medium.

More specifically, the ball pen according to the embodiment comprises a pen-tip and an ink reservoir.

(Pen-tip)

The pen-tip is provided with a ball and a holder, and the holder holds the ball freely rotatably in the distal end of the holder.

The ball is formed of a hard metal and has a diameter of 1.0 mm.

The holder is formed by cutting out a linear material of stainless steel. The holder is provided with a ball house, an ink inducing hole and so on.

The ball is placed in the ball house of the pen-tip and then a spun part is formed around the distal end of the holder, thereby holding the ball freely rotatably in the distal end of the holder.

The clearance between the ball and the holder is so adjusted that the ink-consumption value per unit area is about 0.64 to 1.6 mg/cm$^2$, that is, so that thick and bold letters can be written.

The ball may also be formed of hardened steel or ceramic.

The ball diameter is not limited to 1.0 mm and may be, for example, 0.9 mm or 1.1 mm provided that the ink-consumption value per unit area is adjusted to a value in the range of about 0.64 to 1.6 mg/cm$^2$.

The holder may be formed by cutting out a linear material of a metal, for example, nickel silver or brass, or alternatively, for example, may be formed by cutting a pipe steel material.

(Ink Reservoir)

The ink reservoir is formed of a resin tube. The ink reservoir is positioned and linked to the back end of the above-described pen-tip. And the ink reservoir is filled with the ink for a ball pen as described above.

(Production Method for a Ball Pen)

Method for producing a ball pen of the embodiment does not differ especially from those for producing conventional ball pens.

That is, a ball pen can be produced by forming a pen-tip as described above, positioning an ink reservoir linking to the back end of the pen-tip, filling the ink reservoir with ink for a ball pen, and then effecting a centrifugal treatment to remove air contained in the ink for a ball pen.

(Effect)

Both the quick-drying property of the ink transferred onto the paper surface and the non-drying property of the point of the pen-tip are achieved, and at the same time, good writing feeling can be maintained by adjusting the water content in the range from 30.0 to 80.0 wt %, the content of a volatilization-inhibiting substance in the range from 0.1 to 10.0 wt % and the content of a hardly-volatile water-soluble liquid medium in the range from 1.0 to 40.0 wt % in ink for a ball pen formed to have an ink-consumption value per unit area of 0.64 to 1.6 mg/cm$^2$.

If the water content is 30.0 wt % or less, the ink is very hard to dry when transferred onto the paper surface. On the other hand, if the water content is 80.0 wt % or more, the point of the pen-tip becomes very easy to dry.

If the content of the volatilization-inhibiting substance is 0.1 wt % or less, drying of the point of the pen-tip cannot be sufficiently prevented. On the other hand, if the content of the volatilization-inhibiting substance is 10.0 wt % or more, the ink transferred onto the paper surface becomes hard to dry and lines written therewith are likely to blur.

If the content of the hardly-volatile water-soluble liquid medium is 1.0 wt % or less, good writing feeling cannot be maintained sufficiently. On the other hand, if the content of the hardly-volatile water-soluble liquid medium is 40.0 wt % or more, the ink transferred onto the paper surface becomes hard to dry.

The point of the pen-tip can be securely prevented from drying by composing the volatilization-inhibiting substance with one or more compounds selected from the group consisting of reducing sugars comprising maltitol as a major component, reducing sugars comprising sorbitol as a major component, reducing oligosaccharides, reducing maltooligosaccharides, reducing dextrins, reducing maltodextrins, α-cyclodextrin, β-cyclodextrin, maltosylcyclodextrins, reducing saccharified starches and reducing maltose.

Deterioration of the writing feeling can be securely prevented by composing the hardly-volatile water-soluble liquid medium with one or more compounds selected from the group consisting of polyvalent alcohols such as glycerine, propylene glycol and polyethylene glycol, ethers such as ethylene glycol monomethyl ether, alkylene oxide adducts of glycerine, alkylene oxide adducts of polyglycerine and alkylene oxide adducts of trimethylolpropane.

Further, a ball pen can be provided with both the quick-drying property of the ink when transferred onto the paper surface and the non-drying property of the point of the pen-tip and further with a good writing feeling by filling a ball pen formed to have an ink-consumption value per unit area of 0.64 to 1.6 mg/cm$^2$ with ink for a ball pen for which the water content has been adjusted in the range from 30.0 to 80.0 wt %, the content of a volatilization-inhibiting substance in the range from 0.1 to 10.0 wt % and the content of a hardly-volatile water-soluble liquid medium in the range from 1.0 to 40.0 wt %.

Hereinafter, the present invention will be illustrated in more detail by way of examples and comparative examples.

EXAMPLE 1

Ink for a ball pen was prepared by blending the following ingredients:
Colorant: carbon black: 7.0 wt %
Resin: ammonium salts of styrene acrylic acid resin: 2.0 wt %
Hardly-volatile water-soluble liquid medium: propylene glycol: 15.0 wt %
Volatilization-inhibiting substance: maltosylcyclodextrin: 5.0 wt %
Lubricant: potash soap: 0.5 wt %
Preservative: sodium omadine: 0.2 wt %
Rust preventive: saponin: 0.1 wt %
pH-adjusting agent: aminomethylpropanol: 0.4 wt %
Thickener: carboxyvinyl polymer: 0.2 wt %
Water: ion-exchanged water: 69.6 wt %

EXAMPLE 2

Ink for a ball pen was prepared by blending the following ingredients:
Colorant: carbon black: 7.0 wt %
Resin: ammonium salts of styrene acrylic acid resin: 2.0 wt %
Hardly-volatile water-soluble liquid medium: propylene glycol: 15.0 wt %
Volatilization-inhibiting substance: maltosylcyclodextrin: 5.0 wt %
Lubricant: potash soap: 0.5 wt %
Preservative: sodium omadine: 0.2 wt %
Rust preventive: saponin: 0.1 wt %
pH-adjusting agent: aminomethylpropanol: 0.4 wt %
Thickener: carboxyvinyl polymer: 0.4 wt %
Water: ion-exchanged water: 69.4 wt %

EXAMPLE 3

Ink for a ball pen was prepared by blending the following ingredients:
Colorant: carbon black: 7.0 wt %
Resin: ammonium salts of styrene acrylic acid resin: 2.0 wt %
Hardly-volatile water-soluble liquid medium: propylene glycol: 10.0 wt %
Volatilization-inhibiting substance: reducing dextrin: 5.0 wt %
Lubricant: potash soap: 0.5 wt %
Preservative: sodium omadine: 0.2 wt %
Rust preventive: saponin: 0.1 wt %
pH-adjusting agent: aminomethylpropanol: 0.3 wt %
Thickener: carboxyvinyl polymer: 0.3 wt %
Water: ion-exchanged water: 71.6 wt %

EXAMPLE 4

Ink for a ball pen was prepared by blending the following ingredients:
Colorant: phthalocyanine blue: 7.5 wt %
Resin: ammonium salts of styrene maleic acid resin: 2.2 wt %
Hardly-volatile water-soluble liquid medium: glycerine: 15.0 wt %
Volatilization-inhibiting substance: maltitol: 3.0 wt %
Lubricant: potash soap: 0.5 wt %
Preservative: sodium omadine: 0.2 wt %
Rust preventive: saponin: 0.1 wt %
pH-adjusting agent: aminomethylpropanol: 0.3 wt %
Thickener: carboxyvinyl polymer: 0.3 wt %
Water: ion-exchanged water: 70.9 wt %

EXAMPLE 5

Ink for a ball pen was prepared by blending the following ingredients:
Colorant: phthalocyanine blue: 7.5 wt %
Resin: ammonium salts of styrene maleic acid resin: 2.2 wt %
Hardly-volatile water-soluble liquid medium: glycerine: 25.0 wt %
Volatilization-inhibiting substance: maltosylcyclodextrin: 5.0 wt %
Lubricant: phosphoric acid ester: 0.8 wt %
Preservative: sodium omadine: 0.2 wt %
Rust preventive: saponin: 0.1 wt %
pH-adjusting agent: aminomethylpropanol: 0.3 wt %
Thickener: carboxyvinyl polymer: 0.3 wt %
Water: ion-exchanged water: 58.6 wt %

EXAMPLE 6

Ink for a ball pen was prepared by blending the following ingredients:
Colorant: phthalocyanine blue: 7.5 wt %
Resin: ammonium salts of styrene maleic acid resin: 2.2 wt %
Hardly-volatile water-soluble liquid medium: diethylene glycol: 15.0 wt %
Volatilization-inhibiting substance: reducing dextrin: 5.0 wt %
Lubricant: phosphoric acid ester: 0.8 wt %
Preservative: sodium omadine: 0.2 wt %
Rust preventive: saponin: 0.1 wt %
pH-adjusting agent: aminomethylpropanol: 0.3 wt %
Thickener: carboxyvinyl polymer: 0.3 wt %
Water: ion-exchanged water: 68.6 wt %

EXAMPLE 7

Ink for a ball pen was prepared by blending the following ingredients:
Colorant: phthalocyanine blue: 1.5 wt %
Colorant: titanium oxide: 20.0 wt %
Resin: ammonium salts of styrene maleic acid resin: 2.5 wt %
Hardly-volatile water-soluble liquid medium: 4 mol-adduct of propylene oxide to diglycerine: 5.0 wt %
Volatilization-inhibiting substance: maltosylcyclodextrin: 5.0 wt %
Lubricant: potash soap: 0.5 wt %
Preservative: sodium omadine: 0.2 wt %
Rust preventive: saponin: 0.1 wt %
pH-adjusting agent: aminomethylpropanol: 0.3 wt %
Thickener: xanthane gum: 0.4 wt %
Water: ion-exchanged water: 64.5 wt %

Comparative Example 1

Ink for a ball pen was prepared by blending the following ingredients:
Colorant: phthalocyanine blue: 7.5 wt %
Resin: ammonium salts of styrene maleic acid resin: 2.2 wt %
Hardly-volatile water-soluble liquid medium: glycerine: 15.0 wt %
Volatilization-inhibiting substance: none
Lubricant: potash soap: 0.5 wt %
Preservative: sodium omadine: 0.2 wt %
Rust preventive: saponin: 0.1 wt %
pH-adjusting agent: aminomethylpropanol: 0.3 wt %
Thickener: carboxyvinyl polymer: 0.3 wt %
Water: ion-exchanged water: 73.9 wt %

Comparative Example 2

Ink for a ball pen was prepared by blending the following ingredients:
Colorant: phthalocyanine blue: 7.5 wt %
Resin: ammonium salts of styrene maleic acid resin: 2.2 wt %
Hardly-volatile water-soluble liquid medium: glycerine: 15.0 wt %
Volatilization-inhibiting substance: maltitol: 11.0 wt %
Lubricant: potash soap: 0.5 wt %
Preservative: sodium omadine: 0.2 wt %
Rust preventive: saponin: 0.1 wt % pH-adjusting agent: aminomethylpropanol: 0.3 wt %
Thickener: carboxyvinyl polymer: 0.3 wt %
Water: ion-exchanged water: 62.9 wt %

Comparative Example 3

Ink for a ball pen was prepared by blending the following ingredients:
Colorant: carbon black: 7.0 wt %
Resin: ammonium salts of styrene acrylic acid resin: 2.0 wt %
Hardly-volatile water-soluble liquid medium: none
Volatilization-inhibiting substance: maltosylcyclodextrin: 5.0 wt %
Lubricant: potash soap: 0.5 wt %
Preservative: sodium omadine: 0.2 wt %
Rust preventive: saponin: 0.1 wt %
pH-adjusting agent: aminomethylpropanol: 0.4 wt %
Thickener: carboxyvinyl polymer: 0.4 wt %
Water: ion-exchanged water: 84.4 wt %

Comparative Example 4

Ink for a ball pen was prepared by blending the following ingredients:
Colorant: carbon black: 7.0 wt %
Resin: ammonium salts of styrene acrylic acid resin: 2.0 wt %
Hardly-volatile water-soluble liquid medium: propylene glycol: 45.0 wt %
Volatilization-inhibiting substance: maltosylcyclodextrin: 5.0 wt %
Lubricant: potash soap: 0.5 wt %
Preservative: sodium omadine: 0.2 wt %
Rust preventive: saponin: 0.1 wt %
pH-adjusting agent: aminomethylpropanol: 0.4 wt %
Thickener: carboxyvinyl polymer: 0.4 wt %
Water: ion-exchanged water: 39.4 wt %

Comparative Example 5

Ink for a ball pen was prepared by blending the following ingredients:
Colorant: phthalocyanine blue: 1.5 wt %
Colorant: titanium oxide: 38.0 wt %
Resin: ammonium salts of styrene maleic acid resin: 3.5 wt %
Hardly-volatile water-soluble liquid medium: 4 mol-adduct of propylene oxide to diglycerine: 22.0 wt %
Volatilization-inhibiting substance: maltosylcyclodextrin: 5.0 wt %
Lubricant: potash soap: 0.5 wt %
Preservative: sodium omadine: 0.2 wt %
Rust preventive: saponin: 0.1 wt %
pH-adjusting agent: aminomethylpropanol: 0.3 wt %
Thickener: xanthane gum: 0.2 wt %
Water: ion-exchanged water: 28.7 wt %

Comparative Example 6

Ink for a ball pen was prepared by blending the following ingredients:
Colorant: phthalocyanine blue: 1.5 wt %
Colorant: titanium oxide: 2.5 wt %
Resin: ammonium salts of styrene maleic acid resin: 2.0 wt %
Hardly-volatile water-soluble liquid medium: 4 mol-adduct of propylene oxide to diglycerine: 5.0 wt %
Volatilization-inhibiting substance: maltosylcyclodextrin: 5.0 wt %
Lubricant: potash soap: 0.5 wt %
Preservative: sodium omadine: 0.2 wt %
Rust preventive: saponin: 0.1 wt %
pH-adjusting agent: aminomethylpropanol: 0.3 wt %
Thickener: xanthane gum:. 0.4 wt %
Water: ion-exchanged water: 82.5 wt %

Comparative Example 7

Ink for a ball pen was prepared by blending the following ingredients:
Colorant: phthalocyanine blue: 7.5 wt %
Resin: ammonium salts of styrene maleic acid resin: 2.2 wt %
Hardly-volatile water-soluble liquid medium: diethylene glycol: 45.0 wt %
Volatilization-inhibiting substance: none
Lubricant: phosphoric acid ester: 0.8 wt %
Preservative: sodium omadine: 0.2 wt %
Rust preventive: saponin: 0.1 wt %
pH-adjusting agent: aminomethylpropanol: 0.3 wt %
Thickener: carboxyvinyl polymer: 0.3 wt %
Water: ion-exchanged water: 43.6 wt %

Comparative Example 8

Ink for a ball pen was prepared by blending the following ingredients:
Colorant: phthalocyanine blue: 7.5 wt %
Resin: ammonium salts of styrene maleic acid resin: 2.2 wt %
Hardly-volatile water-soluble liquid medium: none
Volatilization-inhibiting substance: reducing dextrin: 11.0 wt %
Lubricant: phosphoric acid ester: 0.8 wt %
Preservative: sodium omadine: 0.2 wt %
Rust preventive: saponin: 0.1 wt %
pH-adjusting agent: aminomethylpropanol: 0.3 wt %
Thickener: carboxyvinyl polymer: 0.3 wt %
Water: ion-exchanged water: 77.6 wt %

(Estimation of Ink for a Ball Pen and Ball Pens)

Stability of the ink of the above-described examples 1 to 7 and comparative examples 1 to 8 during the time course was estimated. Quick-drying property of the written lines, blurring of the written lines, non-drying property of the point of the pen-tip and writing feeling were estimated for each of ball pens filled with the ink.

Prior to effecting estimation, the above-described ink for a ball pen was filled in a ball pen which had a ball diameter of 1.0 mm and was formed to have an ink-consumption value per unit area of 0.64 to 1.6 mg/cm$^2$.

Writing test was conducted using each of these ball pens.

Writing test was conducted with a writing test machine in compliance with ISO standard 14145-1 and by "spiral writing" under the conditions at a writing speed of 4.5 m/min, a writing angle of 60° and a writing load of 100 g until the ink was used up.

The test paper used for the writing test was compliant with ISO standard 14145-1.

The quick-drying property of the written lines was estimated by judging the results of the writing test in three levels as "Excellent," "Good" and "Bad" under the following criteria:

(i) The example or comparative example in which the written lines got dried in 30 seconds or less was estimated as "Excellent;"

(ii) The example or comparative example in which the written lines got dried in 30 seconds to one minute was estimated as "Good;" and (iii) The example or comparative example in which the written lines did not dry in one minute was estimated as "Bad."

The blurring of the written lines was estimated by judging the results of the writing test in three levels as "Excellent," "Good" and "Bad" under the following criteria:

(i) The example or comparative example in which the written lines did not blur and were clear was estimated as "Excellent;"

(ii) The example or comparative example in which the written lines blurred and were somewhat unclear was estimated as "Good;" and (iii) The example or comparative example in which the written lines significantly blurred and were very unclear was estimated as "Bad."

The non-drying property of the point of the pen-tip was estimated by storing each of the above-described ball pens with the cap taken off and the pen placed horizontally in an environment at a temperature of 25° C., and a humidity of 65% for one month, and conducting the writing test in a similar manner to that described above and judging the results in three levels as "Excellent," "Good" and "Bad" under the following criteria:

(i) The example or comparative example in which blurring in written lines are not observed and writing can be performed in a good condition was estimated as "Excellent;"

(ii) The example or comparative example in which some blurring in written lines are observed and writing can be performed generally in a good condition was estimated as "Good;" and (iii) The example or comparative example in which writing can hardly be performed was estimated as "Bad."

The writing feeling was estimated by manually effecting "spiral writing" with each of the above-described ball pens and judging the results in three levels as "Excellent," "Good" and "Bad" under the following criteria:

(i) The example or comparative example in which writing feeling was smooth and stable was estimated as "Excellent;"

(ii) The example or comparative example in which writing feeling was somewhat rough and hard was estimated as "Good;" and (iii) The example or comparative example in which writing feeling was rough and hard was estimated as "Bad."

The stability of ink with time was estimated by measuring the viscosity of each of the above-described ink immediately after its production and the above-described ink which had been filled in glass bottles and stored in an environment at 50° C. for one month and judging the results in two levels as "Excellent" and "Bad" under the following criteria:

(i) The example or comparative example in which viscosity change with time was hardly observed was estimated as "Excellent;" and (ii) The example or comparative example in which viscosity change with time was significantly observed was estimated as "Bad."

The following Table 1 shows the estimation of each of the above-described ball pens on quick-drying property of the written lines, blurring of the written lines, non-drying property of the point of the pen-tip and writing feeling along with the estimation on stability with time of the above-described ink.

In Table 1, "A" stanfs for quick-drying property of the written lines, "B" for bluring of the written lines, "C" for non-drying property of the point of the pen-tip, "D" for writing feeling and "E" for stability with time of ink.

TABLE 1

|  | A | B | C | D | E |
| --- | --- | --- | --- | --- | --- |
| Ex. 1 | Excell. | Good | Excell. | Excell. | Excell. |
| Ex. 2 | Excell. | Excell. | Excell. | Excell. | Excell. |
| Ex. 3 | Good | Excell. | Excell. | Excell. | Excell. |
| Ex. 4 | Excell. | Excell. | Excell. | Excell. | Excell. |
| Ex. 5 | Excell. | Excell. | Excell. | Excell. | Excell. |
| Ex. 6 | Excell. | Excell. | Excell. | Excell. | Excell. |
| Ex. 7 | Excell. | Excell. | Excell. | Excell. | Excell. |
| Comp. Ex. 1 | Excell. | Excell. | Bad | Excell. | Excell. |
| Comp. Ex. 2 | Bad | Good | Excell. | Excell. | Excell. |
| Comp. Ex. 3 | Excell. | Excell. | Good | Bad | Bad |
| Comp. Ex. 4 | Bad | Good | Excell. | Excell. | Excell. |
| Comp. Ex. 5 | Bad | Excell. | Good | Good | Excell. |
| Comp. Ex. 6 | Excell. | Good | Bad | Bad | Bad |
| Comp. Ex. 7 | Bad | Good | Good | Excell. | Excell. |
| Comp. Ex. 8 | Excell. | Excell. | Good | Bad | Bad |

As indicated above, the ink for a ball pen of Examples 1 to 7 exhibited estimation as "Excellent" or "Good" on each of quick-drying property of the written lines, blurring of the written lines, non-drying property of the point of the pen-tip, writing feeling and stability with time. That is, the ink for a ball pen can achieve both the quick-drying property of the ink transferred onto the paper surface and the non-drying property of the point of the pen-tip, and maintain good writing feeling. The ink for a ball pen is hard to blur when transferred onto the paper surface and further excellent in stability with time.

On the other hand, the ink for a ball pen of Comparative Examples 1 to 8 exhibited at least one estimation as "Bad" on either one of quick-drying property of the written lines, blurring of the written lines, non-drying property of the point of the pen-tip, writing feeling and stability with time. That is, the ink for a ball pen cannot maintain good writing feeling, while both the quick-drying property of the ink transferred onto the paper surface and the non-drying property of the point of the pen-tip are achieved. Further, some of the ink for a ball pen tended to blur when transferred onto the paper surface or was unstable during the time course.

Moreover, experiments for determining the limit values of the water content were conducted and it was confirmed that the ink was excellent in quick-drying property when transferred onto the paper surface and stable with time at least in the range of 30.0 to 80.0 wt %.

It was also confirmed that the ink was extremely hard to dry when transferred onto the paper surface if the water content was 30.0 wt % or less. On the other hand, if the water content was 80.0 wt % or more, the point of the pen-tip became very easy to dry and the ink became unstable during the time course.

Further, experiments for determining the limit values of the content of the volatilization-inhibiting substance were conducted and it was confirmed that the point of the pen-tip could be sufficiently prevented from drying and lines did not blur at least in the range of 0.1 to 10.0 wt %.

It was also confirmed that drying of the point of the pen-tip could not be sufficiently prevented if the content of the volatilization inhibiting substance was 0.1 wt % or less. On the other hand, if the content of the volatilization-inhibiting substance was 10.0 wt % or more, the ink became hard to dry when transferred onto the paper surface and likely to blur.

Furthermore, experiments for determining the limit values of the content of the hardly-volatile water-soluble liquid medium were conducted and it was confirmed that good writing feeling could be maintained and the quick-drying property of the ink transferred onto the paper surface was not deteriorated at least in the range of 1.0 to 40.0 wt %.

It was also confirmed that good writing feeling could not be maintained sufficiently if the content of the hardly-volatile water-soluble liquid medium was 1.0 wt % or less. On the other hand, if the content of the hardly-volatile water-soluble liquid medium was 40.0 wt % or more, the ink transferred onto the paper surface became hard to dry.

The prevent invention is not limited to the above-described examples.

INDUSTRIAL APPLICABILITYI

As described above, according to the present invention, ink for a ball pen can be provided which is useful for a ball pen for writing thick and bold letters and excellent in quick-drying property of the ink when transferred onto the paper surface and the non-drying property of the point of the pen-tip and further with a good writing feeling.

Moreover, according to the present invention, a ball pen for writing thick and bold letters can be provided with which the ink transferred onto the paper surface is easy to dry while the point of the pen-tip is less likely to dry and further which achieves a good writing feeling.

What is claimed is:

1. Ink for a ball pen to be used in an aqueous-gel bold ball pen comprising a ball having a diameter of 0.9 mm or more, formed to have an ink-consumption value per unit area of 0.64 to 1.6 mg/cm$^2$; comprising:

30.0 to 80.0 wt % of water;

0.1 to 10.0 wt % of a volatilization-inhibiting substance; and 1.0 to 40.0 wt % of a hardly-volatile water-soluble liquid medium.

2. The ink for a ball pen according to claim 1, wherein the volatilization-inhibiting substance consists of one or more compounds selected from the group consisting of reducing sugars comprising maltitol as a major component, reducing sugars comprising sorbitol as a major component, reducing oligosaccharides, reducing maltooligosaccharides, reducing dextrins, reducing maltodextrins, α-cyclodextrin, β-cyclodextrin, maltosylcyclodextrins, reducing saccharified starches and reducing maltose.

3. The ink for a ball pen according to claim 1, wherein the hardly-volatile water-soluble liquid medium consists of one or more compounds selected from the group consisting of polyvalent alcohols, ethers, alkylene oxide adducts of glycerine, alkylene oxide adducts of polyglycerine, alkylene oxide adducts of trimethylolpropane.

4. An aqueous-gel bold ball pen comprising a ball having a diameter of 0.9 mm or more, formed to have an ink-consumption value per unit area of 0.64 to 1.6 mg/cm$^2$, which is filled with ink for ball pen comprising:

30.0 to 80.0 wt % of water;

0.1 to 10.0 wt % of a volatilization-inhibiting substance; and 1.0 to 40.0 wt % of a hardly-volatile water-soluble liquid medium.

5. The ink for a ball pen according to claim 2, wherein the hardly-volatile water-soluble liquid medium consists of one or more compounds selected from the group consisting of polyvalent alcohols, ethers, alkylene oxide adducts of glycerine, alkylene adducts of polyglycerine, alkylene oxide adducts of trimethylolpropane.

* * * * *